United States Patent Office 3,720,683
Patented Mar. 13, 1973

3,720,683
2-PHENYL-3-ACYLBENZOTHIAZOLINES AND THEIR OXIDES
Hermann Breuer, Burweinting, and Ernst Schulze, Regensburg, Germany, assignors to E. R. Squibb & Sons, Inc., New York, N.Y.
No Drawing. Filed Sept. 2, 1970, Ser. No. 69,170
Int. Cl. C07d 91/16
U.S. Cl. 260—304          11 Claims

ABSTRACT OF THE DISCLOSURE 2-phenyl-3-acylbenzothiazolines and their 1-oxides of the general formula

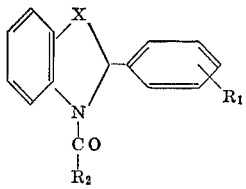

are useful as anti-inflammatory and anti-microbial agents.

SUMMARY OF THE INVENTION

This invention relates to new 2-phenyl-3-acylbenzothiazolines and their 1-oxides of the formula (I)

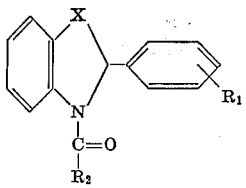

wherein X is thio (—S—), sulfinyl

or sulfonyl

$R_1$ is hydrogen, lower alkyl, lower alkoxy, halogen or trifluoromethyl; $R_2$ is hydrogen, lower alkyl, halo-lower alkylene or amino-lower alkylene, i.e.,

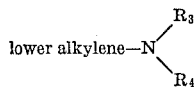

$R_3$ and $R_4$ each is hydrogen, lower alkyl, hydroxy-lower alkyl or together with the nitrogen to which they are attached form an unsubstituted or simply substituted monocyclic, nitrogen heterocyclic of 5-, 6- or 7-members (exclusive of hydrogen), in which an additional nitrogen, oxygen or sulfur may be present, and a total of 18 atoms (exclusive of hydrogen) in the radical.

Preferred within each of the substituent groups are the following: X is thio or sulfinyl; $R_1$ is hydrogen and secondarily lower alkyl, especially methyl, or halogen, especially chlorine, and $R_2$ is lower alkyl or di-lower alkylamino-lower alkylene.

The symbols have the foregoing meanings throughout this specification.

DETAILED DESCRIPTION OF THE INVENTION

The lower alkyl and lower alkylene groups in any of the radicals represented by the symbols are straight or branched chain hydrocarbon groups of up to seven carbon atoms like methyl, ethyl, propyl, isopropyl, butyl, t-butyl and the like. The lower alkoxy groups are composed of similar lower alkyl groups joined to the oxygen. The halogens are the four common halogens, but chlorine and bromine are preferred. The halo-lower alkylene groups are a combination of the foregoing.

In the basic nitrogen containing radical (II)

which forms part of the amino-lower alkylene radical, $R_3$ and $R_4$ each represents hydrogen, lower alkyl or hydroxy-lower alkyl forming such basic groups as amino, lower alkylamino, e.g., methylamino, ethylamino, isopropylamino, di(lower alkyl)amino, e.g., dimethylamino, diethylamino, dipropylamino, (hydroxy-lower alkyl)amino, e.g., hydroxyethylamino, di(hydroxy-lower alkyl)amino, e.g., di(hydroxyethyl)amino, and the like.

In addition the nitrogen may join with the groups represented by $R_3$ and $R_4$ to form a 5 to 7 membered monocyclic nitrogen heterocyclic containing, if desired, an oxygen, sulfur or an additional nitrogen atom, (not more than two hetero atoms altogether), e.g., piperidino, pyrrolidino, morpholino, thiamorpholino, piperazino, hexamethyleneimino and homopiperazino radicals. These heterocyclic groups may also be substituted by one or two groups lower alkyl, lower alkoxy, hydroxy-lower alkyl or alkanoyl-lower alkyl. The lower alkyl, lower alkoxy and hydroxy-lower alkyl groups are the same as those already described; the alkanoyl moieties are the acyl radicals of lower fatty acids, including for example, acetyl, propionyl, butyryl and the like, as well as acyl radicals of higher fatty acids of up to 12 carbons.

Heterocyclic groups represented by the radical II include for example, piperidino, di(lower alkyl)piperidino, e.g., 2,3-dimethylpiperidino, 2-, 3- or 4-(lower alkoxy)-piperidino, e.g., 2-methoxypiperidino, 2-, 3- or 4-(lower alkyl)piperidino, e.g., 2-, 3- or 4-methylpiperidino, N-methylpiperidino, pyrrolidino, (lower alkyl)pyrrolidino, e.g., 2-methylpyrrolidino, di(lower alkyl)pyrrolidino, e.g., 2-3-dimethylpyrrolidino, (lower alkoxy)pyrrolidino, e.g., 2-ethoxypyrrolidino, N-lower alkylpyrrolidino, e.g., N-methylpyrrolidino, morpholino, (lower alkyl)morpholino, e.g., N-methylmorpholino or 2-methylmorpholino, di(lower alkyl)morpholino, e.g., 2,3-dimethylmorpholino, (lower alkoxy)morpholino, e.g., 2-ethoxymorpholino, thiamorpholino, (lower alkyl)thiamorpholino, e.g., N-methylthiamorpholino or 2 - methylthiamorpholino, di-(lower alkyl)thiamorpholino, e.g., 2,3 - diethylthiamorpholino, 2,3-dimethylthiamorpholino, (lower alkoxy) thiamorpholino, e.g., 2 - methoxythiamorpholino, piperazino, (lower alkyl)piperazino, e.g., 4-methylpiperazino, 2 - methylpiperazino, (hydroxy-lower alkyl)piperazino, e.g., 4-(2-hydroxyethyl)piperazino, di(lower alkyl)piperazino, e.g., 2,3 - dimethylpiperazino, alkanoyloxy(lower alkyl)piperazino, e.g., $N^4$-(2-dodecanoyloxyethyl)piperazino, hexamethyleneimino and homopiperazino.

The products of this invention may be derived from 2-mercaptoaniline by the following general synthesis. The 2-mercaptoaniline is made to react with the unsubstituted or substituted benzaldehyde of the formula (III) 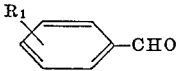

in a solvent like glacial acetic acid, or a mixture of glacial acetic acid with dioxane, dioxane alone, tetrahydrofuran or the like, warming slightly, if desired (e.g., up to about 0–

40° C., preferably room temperature), forming a product of the formula (IV) 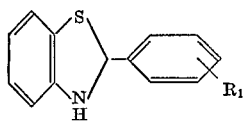

It is not necessary to isolate the product of Formula IV which may be acylated directly by the addition of an acid anhydride of the formula $(R_2CO)_2O$, preferably in excess, e.g., at least two equivalents. In this instance, $R_2$ is hydrogen, lower alkyl or halo-lower alkylene. The product obtained has the formula (V) 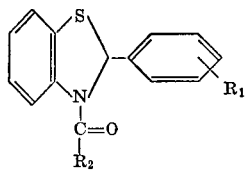

wherein $R_2$ has the meaning just defined.

Treatment of the product of Formula V, wherein $R_2$ is halo-lower alkylene with an amine

in an organic solvent, which may be the base used to introduce the amine group (in this case in excess, i.e., at least two equivalents up to five equivalents with respect to the halo-alkylene compound), at about 0–40°, preferably at room temperature, yields a product of the formula (VI) 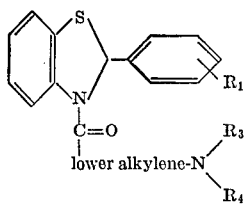

The compounds of Formula V or Formula VI are converted to the oxide by treatment with a peroxide like hydrogen peroxide, peroxybenzoic acid, m-chloroperoxybenzoic acid, peroxyphthalic acid or the like. When one equivalent of peroxide is used, the product is a compound of the Formula I wherein X is sulfinyl. Reaction of V or VI with two equivalents or more of peroxide results in a product wherein X is sulfonyl.

This reaction is preferably carried out in acetic acid or chloroform at room temperature or above, e.g., up to above 40° C.

The compounds of Formula I wherein $R_2$ is an amino-lower alkylene group form salts which are also part of this invention. The salts include acid-addition salts, particularly the non-toxic, physiologically acceptable members. These bases form salts by reaction with a variety of inorganic and organic acids providing acid addition salts including, for example, hydrohalides (especially hydrochloride and hydrobromide), sulfate, nitrate, borate, phosphate, oxalate, tartrate, malate, citrate, acetate, ascorbate, succinate, benzenesulfonate, methanesulfonate, cyclohexanesulfamate and toluenesulfonate. The acid addition salts frequently provide a convenient means for isolating the product, e.g., by forming and precipitating the salt in an appropriate menstruum in which the salt is insoluble, then after separation of the salt, neutralizing with a base such as barium hydroxide or sodium hydroxide, to obtain the free base of Formula I. Other salts may then be formed from the free base by reaction with an equivalent of acid.

The new compounds of this invention have anti-inflammatory properties and are useful as anti-inflammatory agents, for example, to reduce local inflammatory conditions such as those of an edematous nature or resulting from proliferation of connective tissue in various mammalian species such as rats, dogs and the like when given orally in dosages of about 5 to 50 mg./kg./day, preferably 5 to 25 mg./kg./day, in single or 2 to 4 divided doses, as indicated by the carageenan edema assay in rats. The active substance may be utilized in compositions such as tablets, capsules, solutions or suspensions containing up to about 300 mg. per unit of dosage of a compound or mixture of compounds of Formula I or physiologically acceptable acid addition salt thereof. They may be compounded in conventional manner with a physiologically acceptable vehicle or carrier, excipient, binder, preservative, stabilizer, flavor, etc., as called for by accepted pharmaceutical practice. Topical preparations containing about 0.01 to 3 percent by weight of active substance in a lotion, salve or cream may also be used.

The new compounds of Formula I are also useful as anti-microbial agents and may be used to combat infections in animal species, such as mice, rats, dogs, guinea pigs and the like, due to organisms such as *Staphylococcus aureus, Pasteurella multocida* or *Trichophyton mentagrophytes*. For example, a compound or mixture of compounds of Formula I or physiologically acceptable acid addition salt thereof may be administered orally to an infected animal, e.g., to a mouse, in an amount of about 5 to 25 mg. per kg. per day in 2 to 4 divided doses. These may be conventionally formulated in a tablet, capsule or elixir containing about 10 to 250 mg. per dosage unit, by compounding the active substance or substances with the conventional excipient, vehicle, binder, preservative, flavor, etc., as called for by accepted pharmaceutical practice. They may also be applied topically, e.g., to dermatophytosis in a guinea pig, in a lotion, salve or cream at a concentration of about 0.01 to 3 percent by weight.

They may also be used as surface disinfectants. About 0.01 to 1 percent by weight of any of these substances may be dispersed on an inert solid or in a liquid such as water and applied as a dust or spray. They may be incorporated also, for example, in a soap or other cleaning agent, e.g., a solid or liquid detergent, detergent composition, for example, in general cleaning, in cleaning dairy barns or equipment or cleaning food handling or processing equipment.

The following examples are illustrative of the invention and constitute preferred embodiments. Other members of the class are produced by utilizing the appropriately substituted starting material.

Example 1.—2-phenyl-3-formylbenzothiazoline 12.5 g. (0.1 mol.) of 2-mercaptoaniline are dissolved in 100 ml. of glacial acetic acid. While nitrogen is bubbled through the solution, 10.61 g. (0.1 mol.) of benzaldehyde are added. The solution becomes warm. The mixture is stirred for 30 minutes (under cover of nitrogen), then 17.6 g. (0.2 mol.) of formic acid-acetic anhydride are added. A slight warming is observed. The mixture is permitted to stand overnight at room temperature. It is then poured into about 1 liter of water, stirred until the oil which at first separates, crystallizes, and then is filtered under suction. The yield amounts to 21.1 g. of 2-phenyl-3-formylbenzothiazoline, M.P. 98–101°. After recrystallization from methanol, the substance melts at 104–105°.

Example 2.—2-phenyl-3-acetylbenzothiazoline

By following the procedure of Example 1, but substituting an equivalent amount of acetic anhydride for the formic acid-acetic anhydride mixture, 2-phenyl-3-acetylbenzothiazoline is obtained. The product is recrystallized from methanol, M.P. 88–90°.

The following additional compounds are prepared by the same procedure as in Example 2, substituting the appropriately substituted acid anhydride, and in the case of Examples 5 and 7 substituting for benzaldehyde o-methylbenzaldehyde and p-chlorobenzaldehyde, respectively:

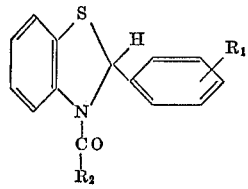

| Example | R₁ | R₂ | M.P., degrees | Recrystallization solvent |
|---|---|---|---|---|
| 3 | H | CH₂CH₃ | 85-88 | Isopropanol. |
| 4 | H | CH₂Cl | 146-148 | Ethanol. |
| 5 | o-CH₃ | CH₂Cl | 87-89 | Isopropanol. |
| 6 | H | CH₂CH₂Cl | (¹) | |
| 7 | p-Cl | CH₂Cl | (¹) | |

¹ Oil.

Example 8.—2-phenyl-3-dimethylaminoacetylbenzothiazoline

To a suspension of 2.9 g. (0.01 mol.) of 2-phenyl-3-cholroacetylbenzothiazoline in 30 ml. of dioxane are added 3.35 g. (0.03 mol.) of 40% aqueous dimethylamine solution. After a short time, a clear solution results. The solution is stirred overnight, the solvent is separated under vacuum and the residue is treated with water. An oil separates which, after standing several hours, crystallizes. The crystals are filtered under suction and dried. The yield amounts to 2.55 g. of 2-phenyl-3-dimethylaminoacetylbenzothiazoline, M.P., 87–90°. After recrystallization from isopropanol, the substance melts at 91–92°.

The following additional compounds are prepared by the same procedure as above substituting the appropriately subsituted starting material:

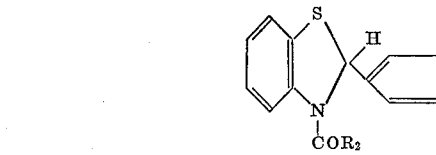

| Example | R₁ | R₂ | M.P. | Recrystallization solvent |
|---|---|---|---|---|
| 9 | H | CH₂—N⟨C₅H₁₀⟩ (piperidino) | 113-114°. | Isopropanol. |
| 10 | o-CH₃ | CH₂—N(CH₃)₂ | 93-96°. | Do. |
| 11 | H | CH₂—CH₂—N(CH₃)₂ | 106-108° (dec.) (oxalate) | Ethanol. |
| 12 | p-Cl | CH₂N(CH₃)₂ | 229-231° (HCl). | |
| 13 | m-CF₃ | CH₂NH₂ | | |
| 14 | H | CH₂CH₂N(CH₂CH₂OH)₂ | | |
| 15 | p-CF₃ | CH₂N(CH₃)(C₃H₇) | | |
| 16 | H | CH₂NHC₄H₉ | | |
| 17 | H | CH₂—N(piperazine)—CH₂CH₂OH | | |

Example 18.—2-phenyl-3-acetylbenzothiazoline 1-oxide 25.5 g. (0.1 mol.) of 2-phenyl-3-acetylbenzothiazoline are dissolved in 100 ml. of glacial acetic acid and cooled to 10°. 9.8 g. (0.1 mol.) of 35% hydrogen peroxide, diluted with 20 ml. of acetone, are added dropwise. The reaction mixture is permitted to stand overnight and the product precipitates upon the addition of water. It is filtered under suction and dried. The crude 2-phenyl-3-acetylbenzothiazoline 1-oxide is recrystallized from ethanol, yield 18.4 g., M.P. 157–158°.

The following additional compounds are prepared by the same procedure as above, substituting the appropriately substituted starting material:

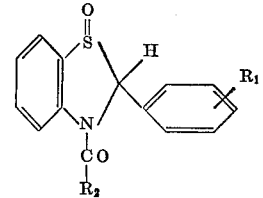

| Example | R₁ | R₂ | M.P.,° | Recrystallization solvent |
|---|---|---|---|---|
| 19 | H | H | 147-149 | Isopropanol. |
| 20 | H | CH₂—CH₃ | 125-127 | Methanol. |
| 21 | H | CH₂—N(CH₃)₂ | 163-164 | Ethanol. |
| 22 | H | CH₂—N⟨C₅H₁₀⟩ (piperidino) | 163-164 | Do. |
| 23 | H | CH₂Cl | 138-139 | Isopropanol. |

Example 24

11.2 g. (0.05 mol.) of 3-acetyl-2-phenylbenzothiazoline are stirred with 22.8 g. of perbenzoic acid in 790 ml. of chloroform for three days at room temperature. The mixture is then stirred overnight at 40°, cooled to room temperature and extracted exhaustively with sodium hydroxide to remove the benzoic acid and unreacted perbenzoic acid. The chloroform solution is treated with activated carbon, filtered and evaporated. The residue is treated with ether and the crystals which form are filtered under suction and dried. The product, 3-acetyl-2-phenylbenzothiazoline 1,1-dioxide, is recrystallized from ethanol, M.P. 121–123°.

The 1,1-dioxides of each of the products of Examples 3 to 17 are produced from those respective products by the procedure described above.

What is claimed is:

1. A compound of the formula

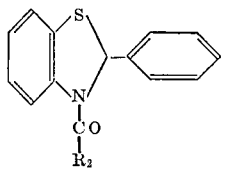

wherein $R_2$ is hydrogen.

2. A compound as in claim 1 wherein $R_2$ is di-lower alkylamino-lower alkylene.

3. A compound as in claim 1 wherein $R_2$ is halo-lower alkylene.

4. A compound of the formula

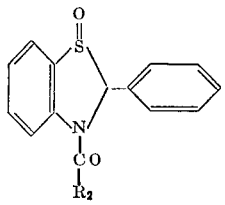

wherein $R_2$ is hydrogen.

5. A compound as in claim 4 wherein $R_2$ is lower alkyl.

6. A compound as in claim 4 wherein $R_2$ is di-lower alkylamino-lower alkylene.

7. A compound as in claim 4 wherein $R_2$ is halo-lower alkylene.

8. A compound as in claim 4 wherein $R_2$ is ethyl.

9. A compound as in claim 2 wherein $R_2$ is dimethylaminomethyl.

10. A compound as in claim 5 wherein the lower alkyl group is methyl.

11. A compound as in claim 6 wherein $R_2$ is dimethylaminomethyl.

References Cited

Wilhelm et al.: J. Heterocyclic Chem., 1969, 6(5), 635–8.

ALEX MAZEL, Primary Examiner

R. J. GALLAGHER, Assistant Examiner

U.S. Cl. X.R.

260—243 B, 247.1, 286 B C, 293.57 301; 474—200, 246, 248, 250, 267, 70